United States Patent
Nguyen et al.

(10) Patent No.: US 12,217,077 B2
(45) Date of Patent: Feb. 4, 2025

(54) HOST CONTAINER MOUNTING

(71) Applicant: Oracle International Corporation, Redwood Shores, CA (US)

(72) Inventors: Trung Hoai Nguyen, Cedar Park, TX (US); Rohit Ravindra Chaware, Pune (IN); Arjun Sridhar, Austin, TX (US); Sohan Dinkar Patil, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 505 days.

(21) Appl. No.: 17/693,800

(22) Filed: Mar. 14, 2022

(65) Prior Publication Data
US 2023/0126922 A1    Apr. 27, 2023

Related U.S. Application Data

(60) Provisional application No. 63/271,549, filed on Oct. 25, 2021.

(51) Int. Cl.
G06F 9/455     (2018.01)

(52) U.S. Cl.
CPC .......... *G06F 9/45558* (2013.01); *G06F 2009/45583* (2013.01); *G06F 2009/45591* (2013.01)

(58) Field of Classification Search
None
See application file for complete search history.

(56) References Cited

U.S. PATENT DOCUMENTS

| | | |
|---|---|---|
| 9,075,638 B2 | 7/2015 | Barnett et al. |
| 9,170,808 B2 | 10/2015 | Sethi et al. |
| 10,721,290 B2 | 7/2020 | Gill et al. |
| 2013/0047160 A1 | 2/2013 | Conover |

OTHER PUBLICATIONS

"Consolidation through Virtualization with the Sun x64 Server Product Line", Available online at https://download.amd.com/techdownloads/consolidation-sol-bf.pdf, 8 pages.

(Continued)

*Primary Examiner* — Chat C Do
*Assistant Examiner* — William C Wood
(74) *Attorney, Agent, or Firm* — Kilpatrick Townsend & Stockton LLP

(57) ABSTRACT

The described techniques are directed towards a host virtual machine configured to host a container. In some examples, a device can monitor communication between a container executing on a host virtual machine and the host virtual machine. The host virtual machine can include a first operating system. The container can include a first computer-executable instruction. The device can detect that the first computer-executable instruction is configured to run on a second operating system based on monitoring the communication between the container executing on the host virtual machine and the host virtual machine. The device can further detect a second computer-executable instruction that is configured to run on the first operating system, the second computer-executable instruction can be accessible to the host virtual machine. The device can further include mounting the second computer-executable instruction from the host virtual machine into the container.

12 Claims, 11 Drawing Sheets

(56) References Cited

OTHER PUBLICATIONS

"Containerization", Available online at https://www.ibm.com/in-en/cloud/learn/containerization, May 15, 2019, 3 pages.

"Explore the Containerization Technologies", Available online at http://www.storm-clouds.eu/services/resources/best-practices/explore-the-containerization-technologies/, 3 pages.

"Windows Container Version Compatibility", Available online at https://docs.microsoft.com/en-us/virtualization/windowscontainers/deploy-containers/version-compatibility?tabs=windows-server-2022%2Cwindows-10-21H1, Oct. 22, 2021, 16 pages.

Gupta, "Comparison Between Security Majors in Virtual Machine and Linux Containers", Information Networking Institute, Available online at https://arxiv.org/ftp/arxiv/papers/1507/1507.07816.pdf, Jul. 2015, 5 pages.

HOST CONTAINER MOUNTING

CROSS-REFERENCES TO RELATED APPLICATIONS

This application claims the benefit of U.S. Provisional Application Ser. No. 63/271,549, filed Oct. 25, 2021; the disclosure of which is hereby incorporated by reference in its entirety for all purposes.

BACKGROUND

A cloud service provider (CSP) can provide multiple cloud services to subscribing customers. These services are provided under different models, including a Software-as-a-Service (SaaS) model, a Platform-as-a-Service (PaaS) model, an Infrastructure-as-a-Service (IaaS) model, and others.

Within the CSP, certain operating system versions may use different versions of binaries. This can be a problem when there is a generic container image running a version of a binary that is not compatible with the host since the binary may be incompatible with certain versions of the host operating system.

SUMMARY

The present embodiments relate to host container mounting. A first exemplary embodiment provides a method for mounting a computer-executable instruction into a container. The method can include monitoring communication between a container executing on a host virtual machine and the host virtual machine. The host virtual machine can include a first operating system. The container can include a first computer-executable instruction.

The method can further include detecting that the first computer-executable instruction is configured to run on a second operating system based on monitoring the communication between the container executing on the host virtual machine and the host virtual machine.

The method can further include detecting, based on detecting that the first computer-executable instruction is configured to run on a second operating system, a second computer-executable instruction configured to run on the first operating system, the second computer-executable instruction can be accessible to the host virtual machine.

The method can further include mounting the second computer-executable instruction from the host virtual machine into the container.

A second exemplary embodiment relates to a cloud infrastructure node. The cloud infrastructure node can include a processor and a non-transitory computer-readable medium. The non-transitory computer-readable medium can include instructions that, when executed by a processor, cause the processor to monitor communication between a container executing on a host virtual machine and the host virtual machine. The host virtual machine can include a first operating system. The container can include a first computer-executable instruction.

The instructions can further cause the processor to detect that the first computer-executable instruction is configured to run on a second operating system based on monitoring the communication between the container executing on the host virtual machine and the host virtual machine.

The instructions can further cause the processor to detect, based on detecting that the first computer-executable instruction is configured to run on a second operating system, a second computer-executable instruction configured to run on the first operating system, the second computer-executable instruction can be accessible to the host virtual machine.

The instructions can further cause the processor to mount the second computer-executable instruction from the host virtual machine into the container.

A third exemplary embodiment relates to a non-transitory computer-readable medium. The non-transitory computer-readable medium can include stored thereon a sequence of instructions, which, when executed by a processor, cause the processor to execute a process. The process can include monitoring communication between a container executing on a host virtual machine and the host virtual machine. The host virtual machine can include a first operating system. The container can include a first computer-executable instruction.

The process can further include detecting that the first computer-executable instruction is configured to run on a second operating system based on monitoring the communication between the container executing on the host virtual machine and the host virtual machine.

The process can further include detecting, based on detecting that the first computer-executable instruction is configured to run on a second operating system, a second computer-executable instruction configured to run on the first operating system, the second computer-executable instruction can be accessible to the host virtual machine.

The process can further include mounting the second computer-executable instruction from the host virtual machine into the container.

DETAILED DESCRIPTION

Figure 1:
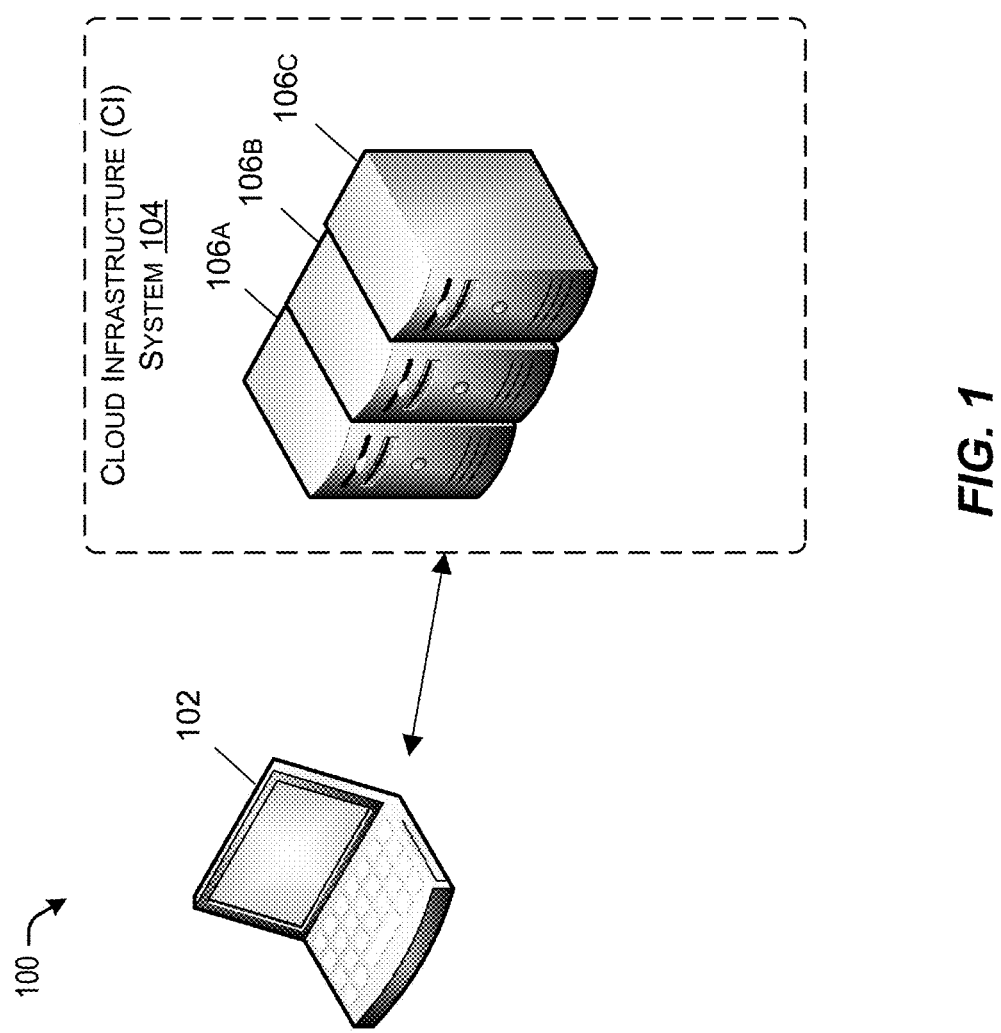
FIG. 1 is a block diagram of an exemplary network environment, according to at least one embodiment.

In the following description, various embodiments will be described. For purposes of explanation, specific configurations and details are set forth to provide a thorough understanding of the embodiments. However, it will also be apparent to one skilled in the art that the embodiments may be practiced without the specific details. Furthermore, well-known features may be omitted or simplified in order not to obscure the embodiment being described.

A container image is a read-only software file that includes an application and its libraries, dependencies, tools, and other files to allow the application to run on multiple computing environments. A container is a virtualized runtime environment where users can isolate resources to run the application. In many instances, container images are created to be generic and are designed to run on different computing environments. In theory, a container image can be loaded onto a host virtual machine, and the host virtual machine can run the code included in the container image. In some instances, the container image includes computer-executable instructions (e.g., a binary) that are incompatible with the operating system (OS) of the host virtual machine. A binary can be a file or a set of files after compiling (e.g., object code files). This can be due to the container image being written on a base OS different than the host OS. As the container executes on the operating system kernel of the host virtual machine, this results in an error for the container. For example, certain versions of iptables (e.g., the binary) may be required for the kube-proxy process. Iptables is a command-line Linux firewall utility for configuring the IP packet rules to allow or block traffic. In an iptables mode, a kube-proxy can attach rules to the network address translation (NAT) pre-routing hook to implement the network address translation and load balancing rules for a network. A base OS of a container can be configured to run a version of iptables. The host virtual machine may run a newer version of the OS and be configured to run a newer version of iptables. In some instances, the newer OS may not be compatible with an older version of iptables. Therefore, the container image that was designed to execute on an older OS, and includes the older iptables version, may be incompatible with the newer version of the OS.

Conventional methods for container compatibility may require the container images to include multiple versions of computer-executable instructions or have access to an external repository of the multiple versions of the computer-executable instructions. The container can call the host OS and request which version of the computer-executable instructions is compatible with the host OS. The container then runs a compatible version of the computer-executable instructions. However, this may only work if the container has access to the compatible version of the computer-executable instructions. Furthermore, this method adds to the complexity of the container and relies on either the container or the repository having the compatible computer-executable instructions. If neither the container nor the repository has the compatible computer-executable instructions, the container may fail. Therefore, a more lightweight and modular solution for an integration of a container with a host OS is needed.

As described herein, a cloud services provider (CSP) can be configured to implement both virtual machine instances (e.g., worker nodes) and containers (e.g., private applications), where the virtual machine instances can act as hosts for the containers. In some examples, a compatible computer-executable instruction from the host can be mounted into the container, and the container can use the host's OS to run the compatible computer-executable instruction. This ensures even if a container image includes a computer-executable instruction that is not compatible with a host OS, the container can execute by accessing the compatible computer-executable instruction from the host and work on any version of a host OS (e.g., Linux).

The described solution herein is novel over other solutions because it allows the container to access a compatible computer-executable instruction from any host OS. The solution can have a wide application as it can apply to any computer-executable instruction that needs to interact with the host, and it can apply to any OS. This described solution can work for situations where a container needs a computer-executable instruction that is compatible with the host OS; and is therefore valuable for any Infrastructure as a Service (IaaS) provider.

Referring to FIG. 1, a block diagram of an exemplary network environment 100 according to one or more embodiments is shown. The network environment 100 is operable to permit data communication between devices within the network environment 100 using one or more wired or wireless networks. As illustrated in FIG. 1, the network environment 100 includes a console 102 and a cloud infrastructure (CI) system 104 (including corresponding computing devices 106a-c).

The console 102 can include a personal computer, including, by way of example, a laptop computer with an OS that is operable to communicate with the CI system 104. A user can, for example, access the console 102 to initiate a new instance of an application by the CI system 104. The application can, in some instances, be initiated by running a container (e.g., the application) hosted by the CI system 104. The CI system 104 can include one or more interconnected computing devices implementing one or more cloud computing applications or services. For example, the CI system 104 can store and provide access to database data (e.g., via a query of the database). The computing devices 106a-c included in the CI system 104 can be in one or more data center environments (e.g., colocation centers) and offer one or more components of the CI system 104 to one or more customers.

The computing device 106a can implement a virtual machine instance and a container. The virtual machine instance can act as a host for the container. In some instances, a host virtual machine can be configured to run a first version of an OS. Furthermore, the host virtual machine instance can further be configured to host a container within the virtual machine instance. In some instances, the container can be configured for a second version of the OS. Furthermore, the container may include one or more computer-executable instructions (e.g., a binary) that while compatible with the second version of the OS, are not compatible with the first version of the OS. The host virtual machine can further be configured to mount a computer-executable instruction (e.g., a compatible binary) into the container to allow the container to execute properly. The host virtual machine can further route instruction traffic from the container to the host virtual machine utilizing the computer-executable instruction that corresponds to the first version of the OS of the host virtual machine. It should be appreciated that some or all of the functionality of the host virtual machine is executed on the computing device 106a.

Figure 2:
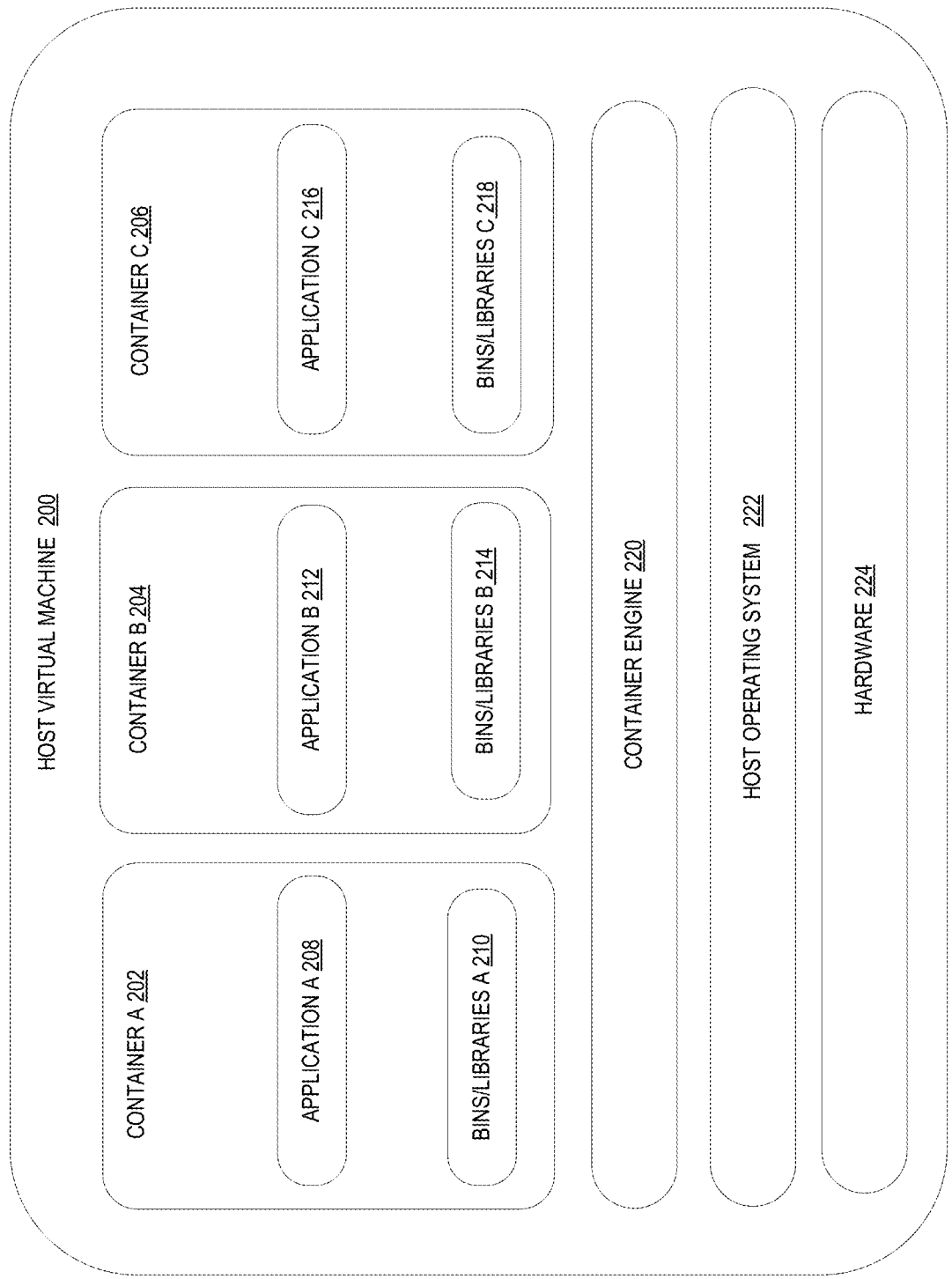
FIG. 2 is a block diagram illustrating an example process for mounting computer-executable instructions into a container, according to at least one embodiment.

Referring to FIG. 2, a block diagram of a set of containers implemented on a host virtual machine 200 in accordance with embodiments is shown. As illustrated, the host virtual machine 200 is configured to host container A 202, container B 204, and container C 216. Container A 202 implements application A 208, and includes bins/libraries A 210, which is software that provides services to application A 202. Container B 204 implements application B 212, and includes bins/libraries B 214, which is software that provides services to application B 210. Container C 206 implements application C 216 and includes bins/libraries C 218, which is software that provides services to application C 216. Container A 202, container B 204, and container C 206 can be built on top of respective base OS images, which can be one of a proprietary distribution (e.g., Linux distributions), but are not always the same as the host OS 222. It should further be appreciated that although three containers are illustrated, the host virtual machine 200 can host one or more containers as deemed appropriate by a cloud services provider (CSP).

In practice, container A 202, container B 204, container C 216 can initially be a respective container image stored on a registry server of the host virtual machine 200. For example, container A 202, container B 204, and container C 206 can be stored as images on a read-only layer of the host virtual machine 200. The container engine 220 can pull a respective image of container A 202, container B 208, and/or container C 216 by moving them to a read/write layer of the host virtual machine 200 to run the containers. Each container image can include a computer-executable instruction used to execute a process on the host virtual machine 200. The container images are created independently from the host OS 222, and therefore are sometimes created without regard or knowledge to the requirements of the host OS 222. For example, software developers can create a container prior to the creation of a new version of an OS. The newer version of the OS may have different requirements than an older version of the OS. The container image can include a computer-executable instruction that is compatible with the older version of the OS, but not compatible with the new version of the OS. Therefore, in some instances, a computer-executable instruction included in an image of container A 202, container B 208, and/or container C 206 may not be compatible with the host OS 222.

Container A 202, container B 208, and container C 206 can further use the host OS 222 to interface with the hardware 224. Container A 202, container B 208, and container C 206 can, however, isolate application A 204, application B 210, and application C 216 running on the host OS 222 by isolating resources like processes, file system, etc. The techniques described herein relate to a user space process using another user space program (computer-executable instruction) to configure the underlying host virtual machine 200. The container engine 220 can run application A 208, application B, and application C on the host virtual machine 200 (e.g., worker node). Using a technique called "namespace isolation," container A 202, container B 204, and container C 206 can isolate their resources (e.g., processes and file systems) from one another as well as from the underlying host virtual machine 200. Container A 202, container B 204, and container C 206 use the same underlying host OS 222. Thus, container A 202, container B 204, and container C 206 can run in their own environments while communicating with the host OS 222 to employ the hardware 224.

The requirement for this is that the computer-executable instruction included in a container image (e.g., image of container A 202) should be compatible with the host OS 222 running on the host virtual machine 200. As described above, in some instances, a computer-executable instruction included in the container image is not incompatible with the host OS 222. Therefore, the container engine 220 can be configured to mount a compatible version of the computer-executable instruction from the host virtual machine 200 into the container (e.g., container A 202). Mounting the compatible computer-executable instruction means making the compatible computer-executable instruction accessible to the container (e.g., container A 202), such that the container can execute its application via the host OS 222. The container (e.g., container A 202) can disregard the incompatible computer-executable instruction and execute the compatible computer-executable instruction on the host OS 222.

To mount the binary, the container engine 220 may attach a file system of the host virtual machine 200 to a virtual file system of the container (e.g., container A 202). The file system of the host virtual machine includes a file location for the compatible computer-executable instruction. By attaching the file system of the host virtual machine 200 to the virtual file system of the container, the computer-executable instruction is accessible to the application (e.g., application A 208) executing on the container (e.g., container A 202).

In some embodiments, the container engine 220 can be configured to mount the binary via a process of volume mounting. In the instance that a logical volume has not been created, the container engine 220 is configured to create a logical volume at the host virtual machine 200. In some embodiments, the logical volume is created by a logical volume manager (LVM), not shown) under the direction of the container engine 220. The LVM is a set of OS commands, library subroutines, and other tools used to create and manage the logical volume. The LVM manages physical storage by mapping data between a logical address of the host virtual machine 200 to physical disk spaces (physical volumes). Each physical volume can belong to a volume group. Each physical volume in a volume group can be subdivided into partitions of equal size. The size of each partition can vary based on different parameters, such as total available disk space. Within each logical group, one or more logical volumes are defined. Data stored in logical volume can be separated across different physical volumes. However, to a user, the data in the logical volume appears to be contiguous. In some embodiments, the LVM can further store a copy of the compatible computer-executable instruction in the logical volume. In other embodiments, the LVM can store a pointer to a memory address of the computer-executable instruction in the logical volume.

Upon creation of the logical volume and storing the compatible computer-executable instruction, the container engine 220 can "mount" logical volume to the container (e.g., container A 202). In particular, the container engine 220 can attach the file system of the host virtual machine 200 to a virtual file system of the container. The file system of the host virtual machine 200 is a hierarchical structure, sometimes known as a file tree, of files and directories. The file system of host virtual machine 200 is mounted to a mount point of the virtual file system of the container (e.g., container A 202). In some embodiments, the mount point can be an empty file of the virtual file system that has been predesignated as a mount point. By mounting the file system of the host virtual machine 200 to the virtual file system of the container (e.g., container A 202), the compatible computer-executable instruction is accessible and readable to the application running on the container. The container engine 220 can further mount the file system of the host virtual machine 200 to any other container that needs to access the compatible computer-executable instruction. Furthermore, the logical volume in the host virtual machine 200 persists, while the container (e.g., container A 202) is ephemeral and reverts to the original container image (e.g., image of container A 202) after execution of the application. Therefore, even after one container instance ceases to execute, a new instance of a container can access the compatible computer-executable instruction via mounting the logical volume.

The container engine 220 can further transmit instructions to container (e.g., container A). The instructions include a logical address of the compatible computer-executable instruction in the logical volume. The instructions further include instructions to disregard the incompatible computer-executable instruction and execute the compatible computer-executable instruction.

In the instance that the container (e.g., container A 202) terminates, the virtual file system of the container ceases to exist, and therefore the file system of the host virtual machine 200 automatically unmounts from the virtual file system of the container. Advantageously, the compatible computer-executable instruction stored in the logical volume persists. Therefore, even though the container image (e.g., container A 202) includes the incompatible computer-executable instruction, a future instance of the container can access the compatible computer-executable instruction via the above-described mounting process.

Figure 3:
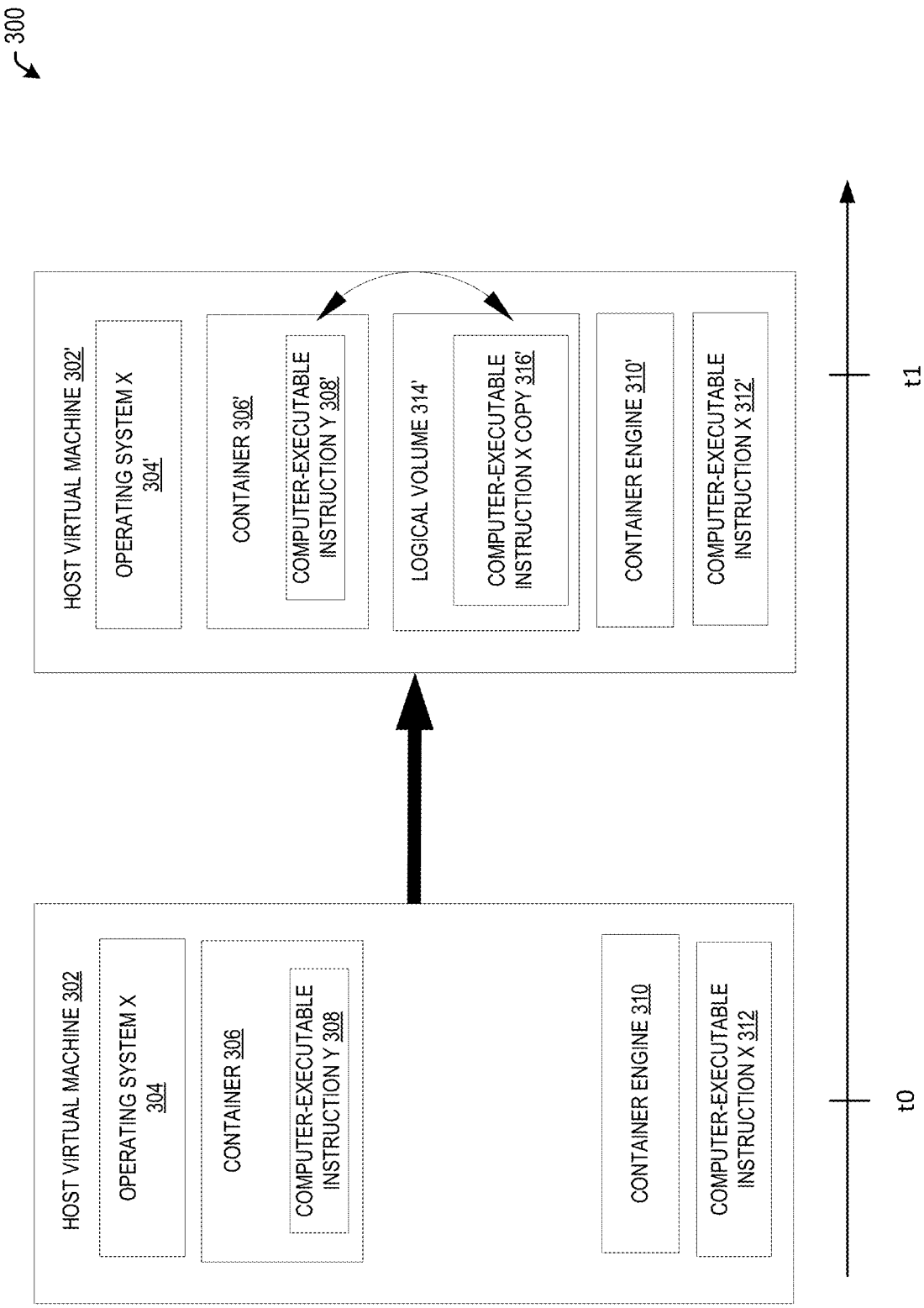
FIG. 3 is a block diagram illustrating an example process for mounting computer-executable instructions into a container, according to at least one embodiment.

Referring to FIG. 3, a block diagram illustrating an example process 300 for mounting a computer-executable instruction (e.g., a binary such as "iptables" or the like) of a host virtual machine into a container hosted by the host according to some embodiments is shown. The process 300 illustrates a single host (virtual machine) 302 and 302' (e.g., at two different points in time—prior to the mounting (at t0) and after the mounting (at t1)), respectively. In this example, at t0, the host virtual machine 302 may be executing the OS version X (OS X) 304, and may also host one or more containers (e.g., container 306). The container 306 may be configured for base OS version Y (not shown). The container 306 can be configured to share the OS X 304 with any other container running on the host virtual machine 302. The container 306 can further include computer-executable instruction Y 308, that is not compatible with the OS X 304. In other words, computer-executable instruction Y 308 cannot run on the OS X 304. The host virtual machine 302 can further include a container engine 310 for running the container 306. The host virtual machine 302 can further include computer-executable instruction X 312, which is compatible with the OS X 304.

The virtual machine 302 can receive a request to execute an application included in the container 306. The request can include a name of a container (e.g., container 306) to run. Based on the name, a container engine 310 can retrieve the container 306 to run on the host virtual machine 302. In this example, the container 306 cannot run computer-executable instruction Y 308 on the host virtual machine 302 because computer-executable instruction Y 308 is not compatible with the OS X 304. As the OS X 304 attempts to run the container 306, an error can be detected by the container engine 310. In particular, the container engine 310 can monitor data traffic between the OS X 304 and the container 306 and determine that computer-executable instruction Y 308 cannot be executed by the OS X 304.

Based at least in part on the determination that the computer-executable instruction Y 308 and the OS X 304 are not compatible, the container engine 310 can determine whether a compatible version of computer-executable instruction Y 308 is present on or accessible to the host virtual machine 302. The container engine 310 can access the file system of the host virtual machine 302 and search the directory for the computer-executable instruction X 312 which is compatible with the OS X 304.

In response to detecting the computer-executable instruction X 312, the container engine 310 can be configured to mount the computer-executable instruction X 312 into the container 306, such that the container 306 has access to the computer-executable instruction X 312. To mount the computer-executable instruction X 312, the container engine 310 can create a logical volume, which is a logical memory space accessible via a directory of the host virtual machine 302. The container engine 310 can further create a computer-executable instruction X copy from the stored computer-executable instruction X 312. The container engine 310 can further store the copy of the computer-executable instruction X 312 in the logical volume. Alternatively, the container engine 310 can store a pointer with the memory address of the computer-executable instruction X 312. The container engine 310 can then mount the logical volume into the container 306. A state of the host virtual machine 302' including a volume 314' and the computer-executable instruction X copy 316' at t1 is illustrated for example purposes at FIG. 3. As illustrated, the host virtual machine 302' can include a logical volume 314' with the computer-executable instruction X copy 316'. The logical volume 314' can further be mounted into the container 306'. The container 306' can access the computer-executable instruction X copy 316' and execute the instruction on the operating system X 304'.

Figure 4:
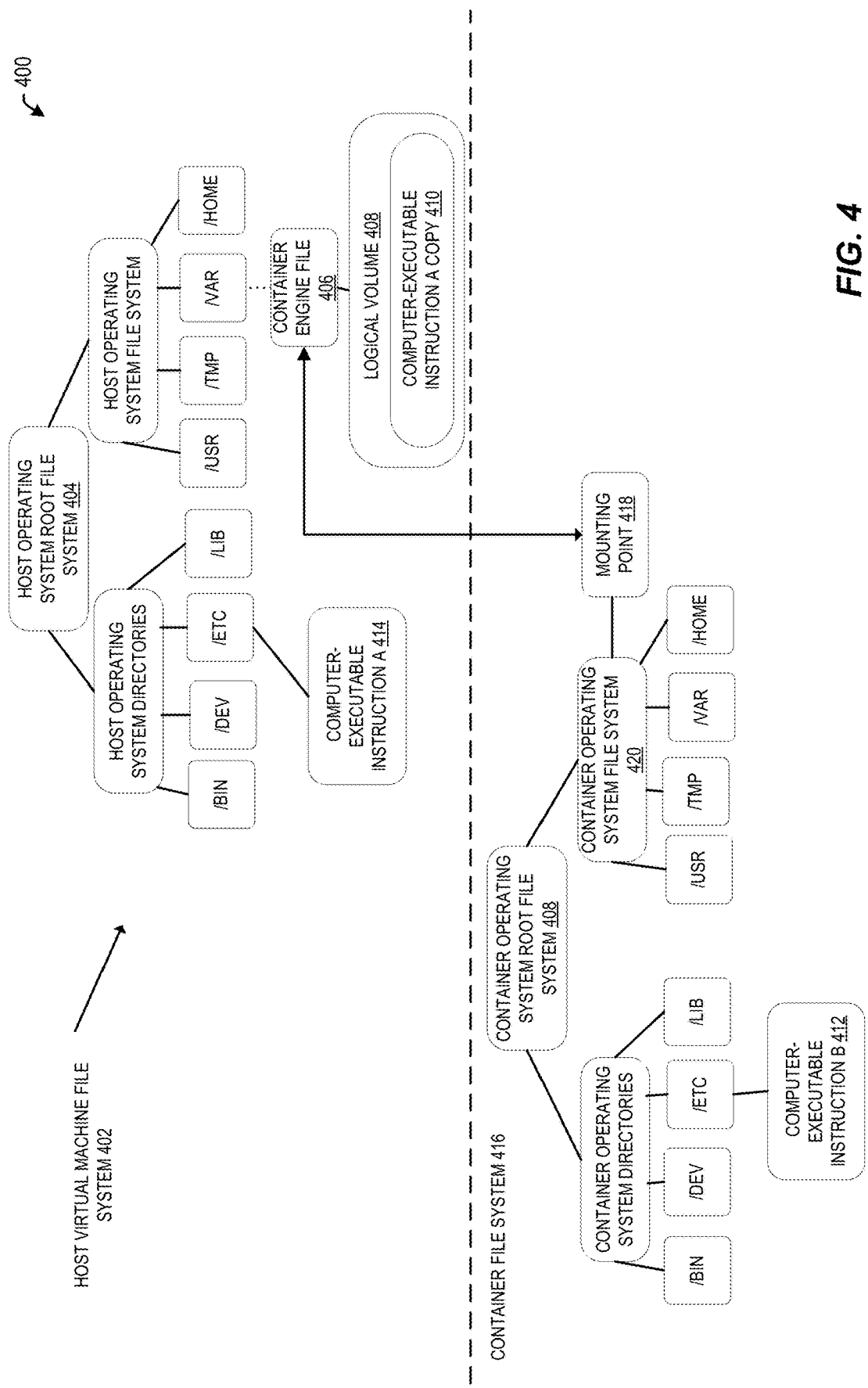
FIG. 4 is a block diagram illustrating an example process for mounting computer-executable instructions into a container, according to at least one embodiment.

FIG. 4 is a block diagram 400 illustrating a logical volume that is mounted to a virtual file system of a container according to some embodiments. As illustrated, a host virtual machine file system 402 can include a host operating system root file system 404, which is the top-level directory of the host virtual machine file system 402. The host virtual machine file system 402 can also include a container engine file 406. The container engine file 406 can include a file or sets of files that are managed by a container engine. The container engine can manage a logical volume 408. As described above, the logical volume 408 can be a logical memory space that is mapped to a physical memory space. As described above, the container engine can store computer-executable instruction A 410 in the logical volume 408.

As described above, the container engine can monitor data traffic between the container and the host virtual machine running the container. While monitoring the data traffic, the container engine can determine that the container includes computer-executable instruction B 412 that is incompatible with the host operating system. In response, the container engine can search the host virtual machine file system for a compatible version of the computer-executable instruction B 412. The container engine can find the computer-executable instruction A 414. The container engine can further make a computer-executable instruction A copy 410 and store the copy in the logical volume 408.

The container engine can further mount the computer-executable instruction A copy 410 into the container. To mount the computer-executable instruction A copy 410 to the container can attach the computer-executable instruction A copy 410 to the container file system 414. The container virtual file system 416 can include a mounting point 418, which is an empty file used for mounting. The container file system 414 can be a virtual file system in the software layer of the host operating system kernel. The container file system can act as an interface between the container and the host virtual machine's resources. For example, the container engine can attach the container engine file 406 to the mounting point 418 by adding a pointer to the container engine file 406 in the mounting point 418. This leads to the container engine file 406 to essentially replacing the mounting point 418 in the container file system 414. The container engine can further provide the container instructions to disregard computer-executable instruction B 412 and execute computer-executable instruction A copy 410. For example, the container engine can provide a path:/container operating system root file system 408/container operating system file system 420/mounting point 418/container engine 406/logical volume 408/computer-executable instruction A copy 410 to the container to reach the computer-executable instruction A copy 410.

As described above, multiple containers can run on the host virtual machine. Each other container can also be managed by the container engine. Therefore, if another container needs to access computer-executable instruction A copy 410, the container engine can provide a path for the other container to access the computer-executable instruction A copy 410. Furthermore, as described above, each container is ephemeral and reverts to the original container image upon completion, while the logical volume 408 and the computer-executable instruction A copy 410 persist. When the container ceases to execute, the computer-executable instruction A copy 410 can be unmounted as the container virtual file system 416 also ceases to exist. Therefore, if a new instance of the container needs to access the computer-executable instruction A copy 410, the container engine can make the instruction available via the mounting process.

Figure 5:
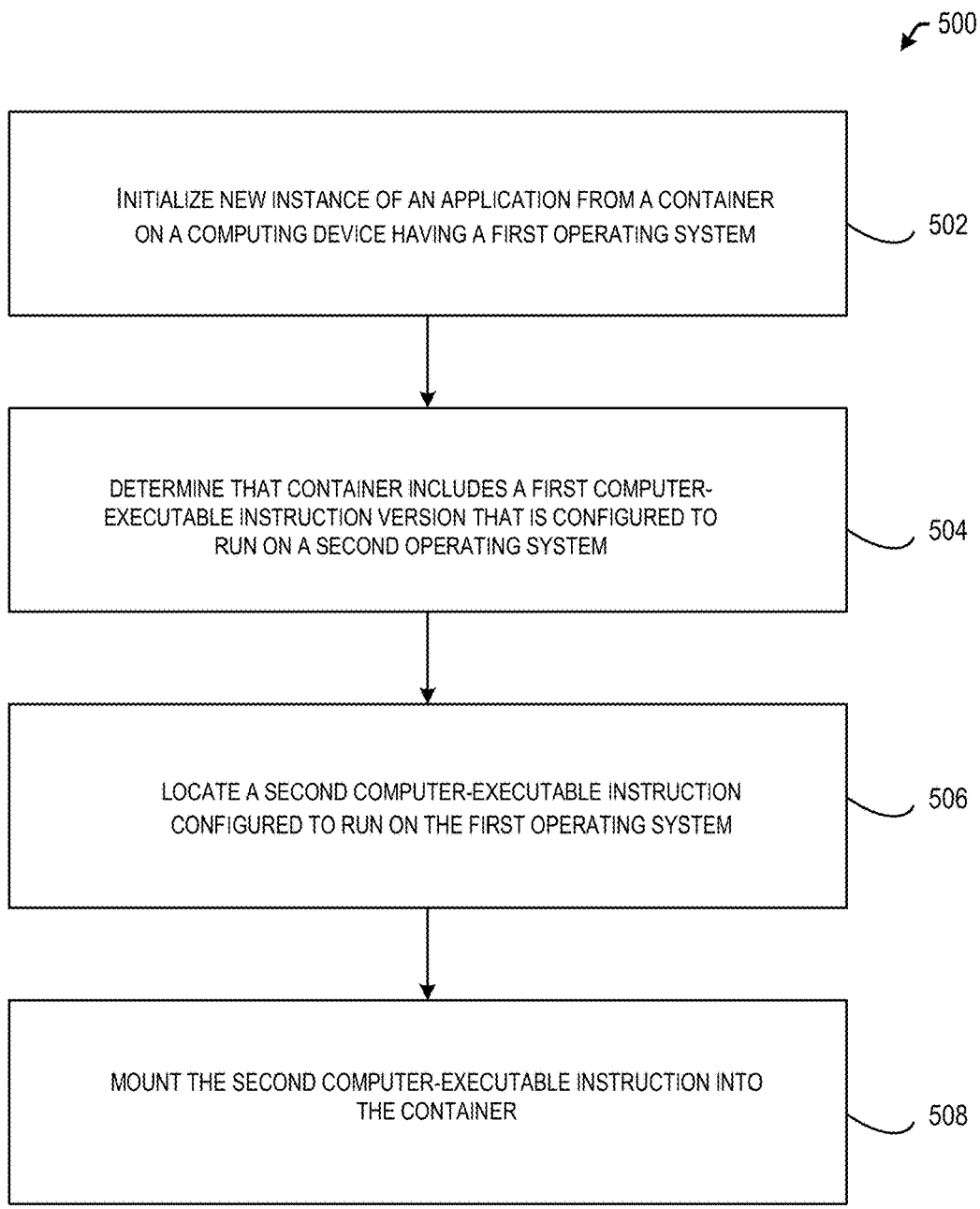
FIG. 5 is a flow diagram illustrating an example process for mounting computer-executable instructions into a container, according to at least one embodiment.

FIG. 5 illustrates an example flow 500 for providing a compatible computer-executable instruction to a container in accordance with one or more embodiments. The operations of processes 500 and 600 may be performed by any suitable computing device (e.g., a user device, a server device, a controller device, a resident device, or the like) and may be used to perform one or more operations of these processes. Processes 500 and 600 (described below) are respectively illustrated as logical flow diagrams, each operation of which represents a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

At 502, a computing device can initialize an instance of an application from a container. For example, the computing device can be a host computing device that hosts a container. The container can be a self-contained software package that includes an application and related code to execute the application. When the application is not executing, the container can be stored in a read-only layer of the computing device. A user or a software application can transmit a request to the computing device for a new instance of the application. In response to receiving the request, the computing device can move the container from the read-only layer to a read/write layer to initialize the instance of the application.

At 504, the computing device can determine that the container includes a first computer-executable instruction that is not compatible with a first operating system. For example, the computing device can be the host device that is hosting the container, and the first operating system can be the host operating system. The incompatibility can be based on the container having a first computing-executable instruction that is configured to run on a second operating system (e.g., a base operating system) that is different than the first operating system. Furthermore, the first operating system can be configured to run a different version (e.g., the second computer-executable instruction) of the first computer-executable instruction. Furthermore, the first operating system can be configured to run the second computer-executable instruction and not be compatible with the first computer-executable instruction.

In some embodiments, the computing device can monitor the data to and from the container the first operating system. The computing device can further detect an error upon an attempted execution of the first computer-executable instruction. Upon detecting the error, the computing device can determine that the first computer-executable instruction is incompatible with the first operating system.

At 506, the computing device can locate a second computer-executable instruction on the computing device in response to determining that the first computer-executable instruction is not compatible with the first operating system. For example, the first computer-executable instruction can be a first version of a binary that are compatible with the second operating system and the second computer-executable instruction is a new version of the binary and are compatible with the first operating system. The computing device can determine that the second computer-executable instruction is compatible with the first operating system based on the second computer-executable instruction being found in the computing device.

At 508, the computing device can mount the second computer-executable instruction into the container. In particular, the computing device can implement a technique using a logical volume to mount the second computer-executable instruction. The computing device can store the second computer-executable instruction in a logical volume and provide the container with a data path to access the instruction. This process is described with more particularity with respect to FIG. 6.

Figure 6:
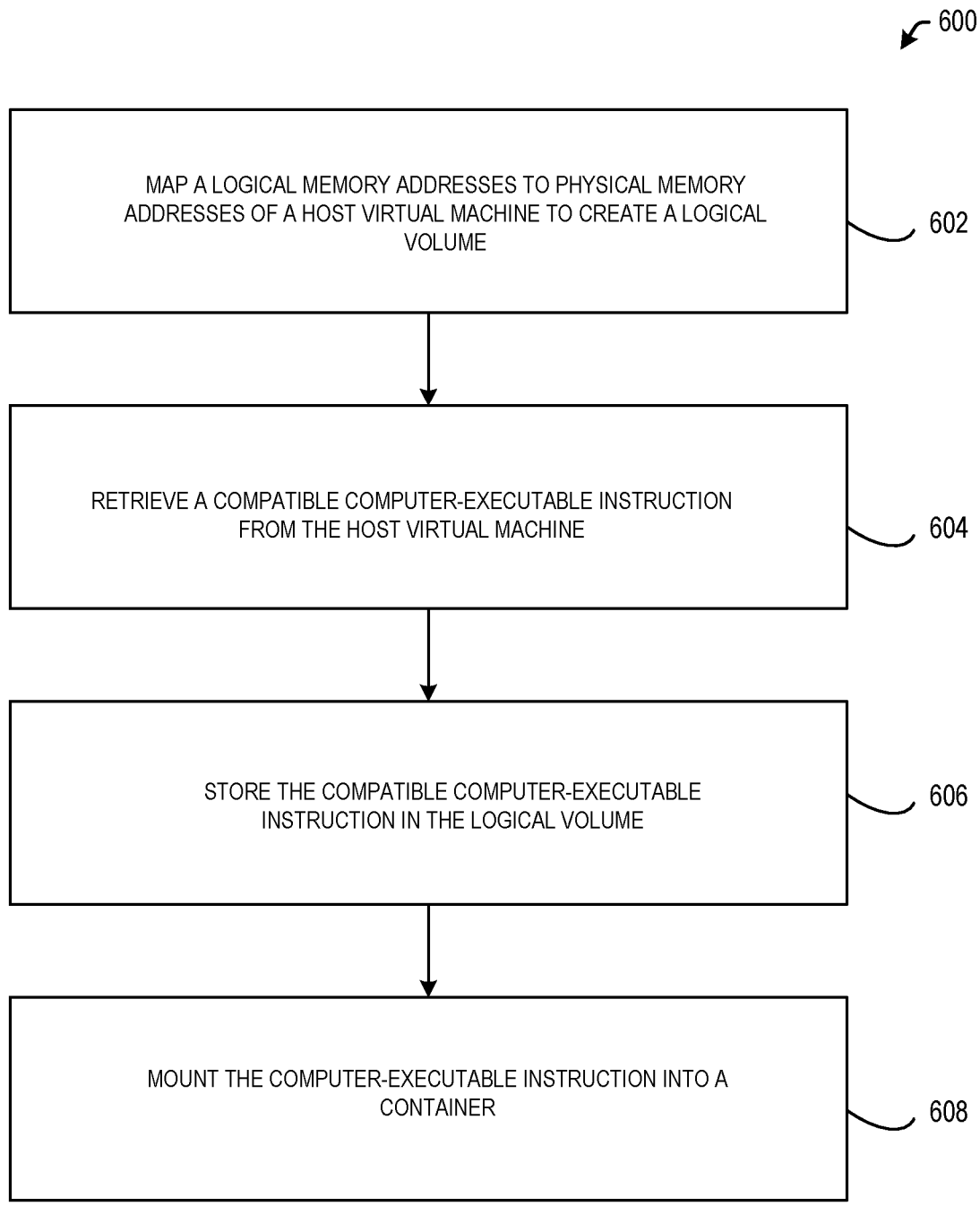
FIG. 6 is a flow diagram illustrating an example process for mounting computer-executable instructions into a container, according to at least one embodiment.

FIG. 6 illustrates an example flow 600 for mounting a computer-executable instruction into a container, in accordance with one or more embodiments. At 602, a computing device can create a logical volume via a virtual memory space. For example, the computing device can map virtual memory addresses to the physical memory addresses of the computing device to create the logical volume.

At 604, the computing device can retrieve a compatible computer-executable instruction from the computing device's memory or an accessible and external source (e.g., a data repository). The computing device can be, for example, a host computing device that hosts a container. The container can include a computer-executable instruction that is incompatible with the computing device's operating system. The compatible computer-executable instruction can further be stored on the computing device's memory or in an external storage accessible to the computing device. The retrieved computer-executable instruction can be an instruction that is compatible with the computing device's operating system. In some embodiments, the computing device can either retrieve the computer-executable instruction by making a copy of the computer-executable instruction. In other embodiments, the computing device can retrieve a memory address for the computer-executable instruction.

At 606, the computing device can store computer-executable instruction in the logical volume. The computing device can store the computer-executable instruction through various methods. For example, the computing device can make a copy of the computer-executable instruction and store the copy in the logical volume. The computing device can also write a pointer that includes the memory address of the computer-executable instruction in the logical volume.

At 608, the computing device can mount the computer-executable instruction into the container. The computing device can mount the computing-executable instruction by attaching the instruction to a virtual file system of the container. The container's virtual file system can be a file system located in a software layer of the computing device's operating system. The container's virtual file system can act as an interface between the container and the computing device's resources. In some embodiments, the container's virtual file system is organized as a file tree. The virtual file system includes a node that acts as a mounting point. The mounting point can be an empty file that can be replaced by a file of another file system. In these instances, the computing device attaches the computer-executable instruction file from the computing devices file system to the mounting point of the container's virtual file system. By attaching the computer-executable instruction file to the mounting point, the computing device can create a path for the container to access the compatible computer-executable instruction.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing, and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may first need to be set up. In some instances, the provisioning can be done manually, a provisioning tool may be utilized to provision the resources, and/or deployment tools may be utilized to deploy the code once the infrastructure is provisioned.

Figure 7:
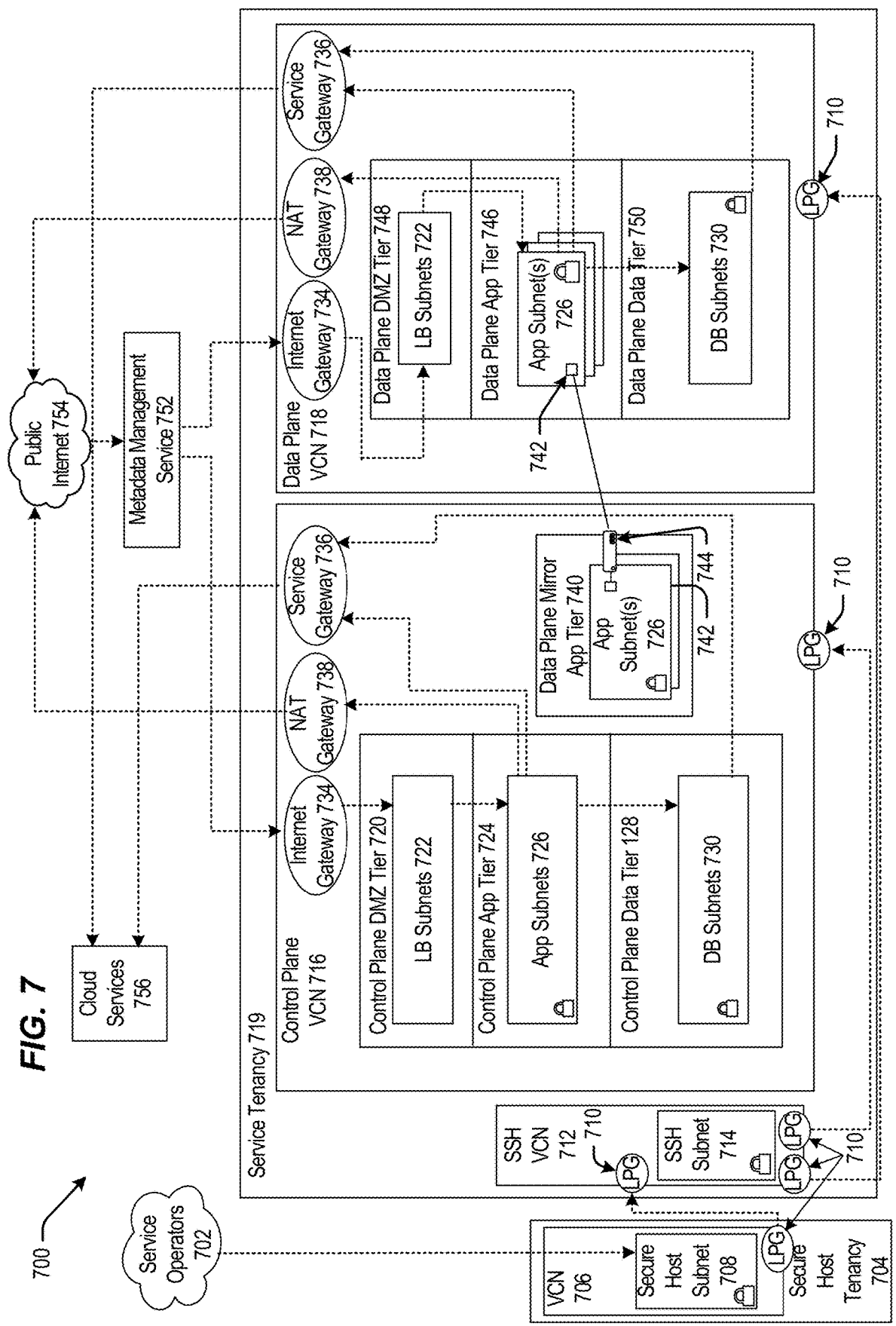
FIG. 7 is a block diagram illustrating a pattern for implementing a cloud infrastructure as a service system, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 14, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively couple to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Memory that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of threat prevention, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
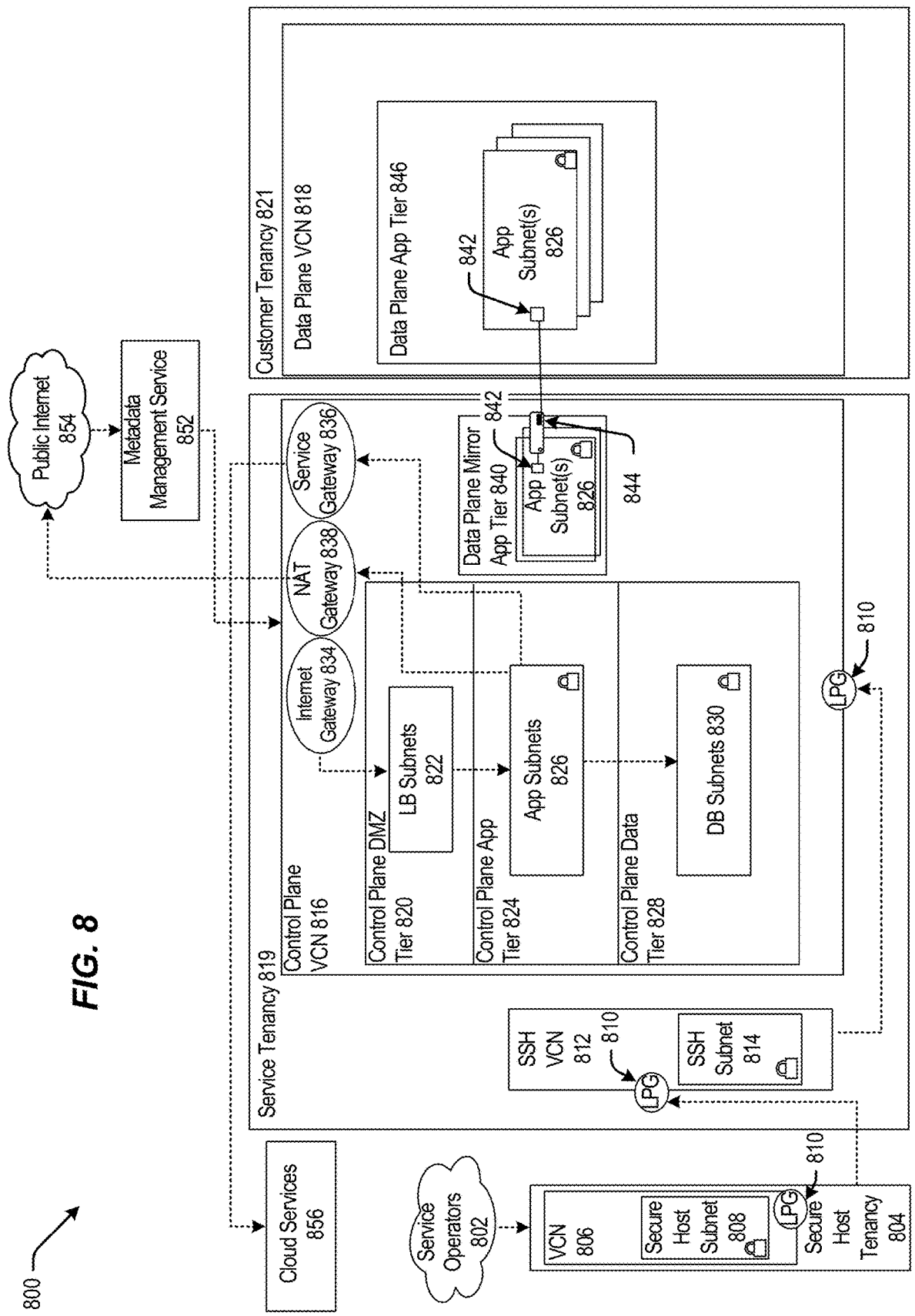
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 702 of FIG. 7) can be communicatively coupled to a secure host tenancy 804 (e.g., the secure host tenancy 704 of FIG. 7) that can include a virtual cloud network (VCN) 806 (e.g., the VCN 706 of FIG. 7) and a secure host subnet 808 (e.g., the secure host subnet 708 of FIG. 7). The VCN 876 can include a local peering gateway (LPG) 810 (e.g., the LPG 710 of FIG. 7) that can be communicatively coupled to a secure shell (SSH) VCN 812 (e.g., the SSH VCN 712 of FIG. 7) via an LPG 810 contained in the SSH VCN 812. The SSH VCN 812 can include an SSH subnet 814 (e.g., the SSH subnet 714 of FIG. 7), and the SSH VCN 812 can be communicatively coupled to a control plane VCN 816 (e.g., the control plane VCN 716 of FIG. 7) via an LPG 810 contained in the control plane VCN 816. The control plane VCN 816 can be contained in a service tenancy 819 (e.g., the service tenancy 719 of FIG. 7), and the data plane VCN 818 (e.g., the data plane VCN 718 of FIG. 7) can be contained in a customer tenancy 821 that may be owned or operated by users, or customers, of the system.

The control plane VCN 816 can include a control plane DMZ tier 820 (e.g., the control plane DMZ tier 720 of FIG. 7) that can include LB subnet(s) 822 (e.g., LB subnet(s) 722 of FIG. 7), a control plane app tier 824 (e.g., the control plane app tier 724 of FIG. 7) that can include app subnet(s) 826 (e.g., app subnet(s) 726 of FIG. 7), a control plane data tier 828 (e.g., the control plane data tier 728 of FIG. 7) that can include database (DB) subnet(s) 830 (e.g., similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g., the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g., the service gateway 736 of FIG. 7) and a network address translation (NAT) gateway 838 (e.g., the NAT gateway 738 of FIG. 7). The control plane VCN 816 can include the service gateway 836 and the NAT gateway 838.

The control plane VCN 816 can include a data plane mirror app tier 840 (e.g., the data plane mirror app tier 740 of FIG. 7) that can include app subnet(s) 826. The app subnet(s) 826 contained in the data plane mirror app tier 840 can include a virtual network interface controller (VNIC) 842 (e.g., the VNIC of 742 of FIG. 7) that can execute a compute instance 844 (e.g., similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g., the data plane app tier 846 of FIG. 8) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g., the metadata management service 702 of FIG. 7) that can be communicatively coupled to public Internet 854 (e.g., public Internet 704 of FIG. 7). Public Internet 854 can be communicatively coupled to the NAT gateway 838 contained in the control plane VCN 816. The service gateway 836 contained in the control plane VCN 816 can be communicatively couple to cloud services 856 (e.g., cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 1," may be located in Region 1 and in "Region 2." If a call to Deployment 1 is made by the service gateway 836 contained in the control plane VCN 816 located in Region 1, the call may be transmitted to Deployment 1 in Region 1. In this example, the control plane VCN 816, or Deployment 1 in Region 1, may not be communicatively coupled to, or otherwise in communication with, Deployment 2 in Region 2.

Figure 9:
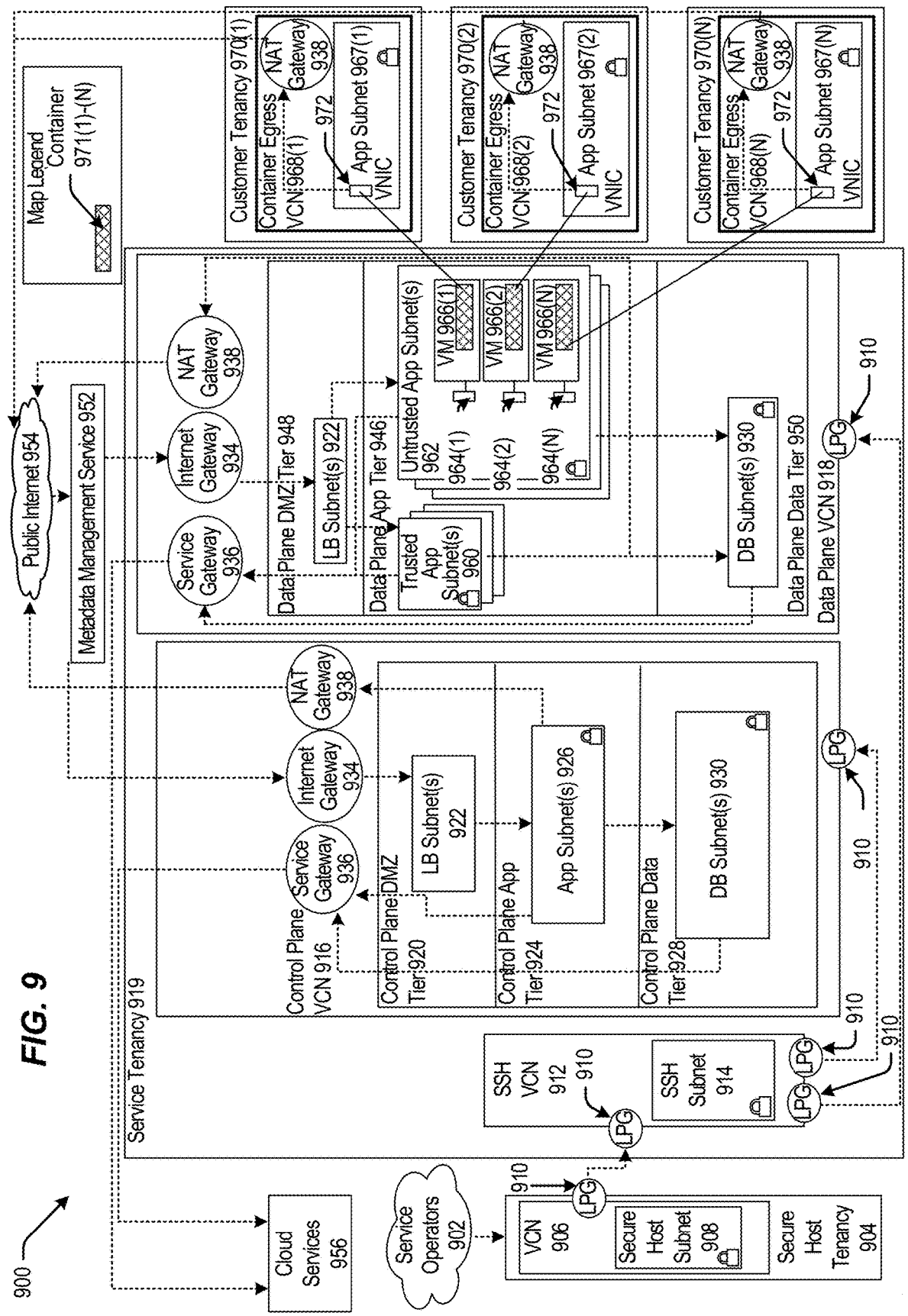
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 702 of FIG. 7) can be communicatively coupled to a secure host tenancy 904 (e.g., the secure host tenancy 704 of FIG. 7) that can include a virtual cloud network (VCN) 906 (e.g., the VCN 906 of FIG. 7) and a secure host subnet 908 (e.g., the secure host subnet 708 of FIG. 7). The VCN 906 can include an LPG 910 (e.g., the LPG 710 of FIG. 7) that can be communicatively coupled to an SSH VCN 912 (e.g., the SSH VCN 712 of FIG. 7) via an LPG 910 contained in the SSH VCN 912. The SSH VCN 912 can include an SSH subnet 914 (e.g., the SSH subnet 714 of FIG. 7), and the SSH VCN 912 can be communicatively coupled to a control plane VCN 916 (e.g., the control plane VCN 716 of FIG. 7) via an LPG 910 contained in the control plane VCN 916 and to a data plane VCN 918 (e.g., the data plane 718 of FIG. 7) via an LPG 910 contained in the data plane VCN 918. The control plane VCN 916 and the data plane VCN 918 can be contained in a service tenancy 919 (e.g., the service tenancy 719 of FIG. 7).

The control plane VCN 916 can include a control plane DMZ tier 920 (e.g., the control plane DMZ tier 720 of FIG. 7) that can include load balancer (LB) subnet(s) 922 (e.g., LB subnet(s) 722 of FIG. 7), a control plane app tier 924 (e.g., the control plane app tier 724 of FIG. 7) that can include app subnet(s) 926 (e.g., similar to app subnet(s) 726 of FIG. 7), a control plane data tier 928 (e.g., the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g., the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g., the service gateway 736 of FIG. 7) and a network address translation (NAT) gateway 938 (e.g., the NAT gateway 738 of FIG. 7). The control plane VCN 916 can include the service gateway 936 and the NAT gateway 938.

The data plane VCN 918 can include a data plane app tier 946 (e.g., the data plane app tier 746 of FIG. 7), a data plane DMZ tier 948 (e.g., the data plane DMZ tier 748 of FIG. 7), and a data plane data tier 950 (e.g., the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g., public Internet 754 of FIG. 7). The Internet gateway 934 contained in the control plane VCN 916 and contained in the data plane VCN 918 can be communicatively coupled to a metadata management service 952 (e.g., the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
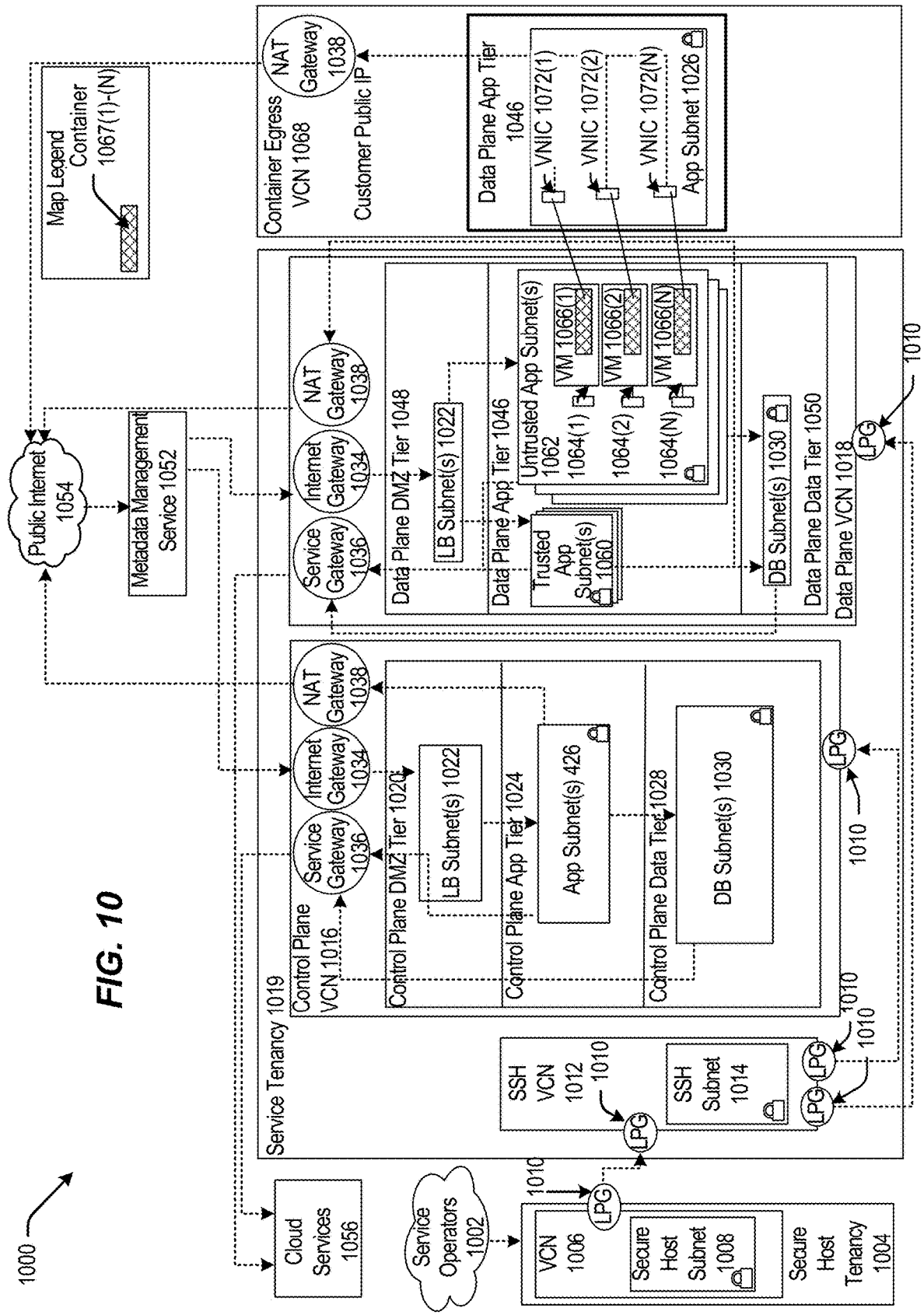
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 702 of FIG. 7) can be communicatively coupled to a secure host tenancy 1004 (e.g., the secure host tenancy 704 of FIG. 7) that can include a virtual cloud network (VCN) 1006 (e.g., the VCN 706 of FIG. 7) and a secure host subnet 1008 (e.g., the secure host subnet 708 of FIG. 7). The VCN 1006 can include an LPG 1010 (e.g., the LPG 710 of FIG. 7) that can be communicatively coupled to an SSH VCN 1012 (e.g., the SSH VCN 712 of FIG. 7) via an LPG 1010 contained in the SSH VCN 1012. The SSH VCN 1012 can include an SSH subnet 1014 (e.g., the SSH subnet 714 of FIG. 7), and the SSH VCN 1012 can be communicatively coupled to a control plane VCN 1016 (e.g., the control plane VCN 716 of FIG. 7) via an LPG 1010 contained in the control plane VCN 1016 and to a data plane VCN 1018 (e.g., the data plane 718 of FIG. 7) via an LPG 1010 contained in the data plane VCN 1018. The control plane VCN 1016 and the data plane VCN 1018 can be contained in a service tenancy 1019 (e.g., the service tenancy 719 of FIG. 7).

The control plane VCN 1016 can include a control plane DMZ tier 1020 (e.g., the control plane DMZ tier 720 of FIG. 7) that can include LB subnet(s) 1022 (e.g., LB subnet(s) 722 of FIG. 7), a control plane app tier 1024 (e.g., the control plane app tier 724 of FIG. 7) that can include app subnet(s) 1026 (e.g., app subnet(s) 726 of FIG. 7), a control plane data tier 1028 (e.g., the control plane data tier 728 of FIG. 7) that can include DB subnet(s) 1030 (e.g., DB subnet(s) 730 of FIG. 7). The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g., the service gateway 736 of FIG. 7) and a network address translation (NAT) gateway 1038 (e.g., the NAT gateway 738 of FIG. 7). The control plane VCN 1016 can include the service gateway 1036 and the NAT gateway 1038.

The data plane VCN 1018 can include a data plane app tier 1046 (e.g., the data plane app tier 746 of FIG. 7), a data plane DMZ tier 1048 (e.g., the data plane DMZ tier 748 of FIG. 7), and a data plane data tier 1050 (e.g., the data plane data tier 750 of FIG. 7). The data plane DMZ tier 1048 can include LB subnet(s) 1022 that can be communicatively coupled to trusted app subnet(s) 1060 (e.g., trusted app subnet(s) 960 of FIG. 9) and untrusted app subnet(s) 1062 (e.g., untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g., public Internet 754 of FIG. 7).

The Internet gateway 1034 contained in the control plane VCN 1016 and contained in the data plane VCN 1018 can be communicatively coupled to a metadata management service 1052 (e.g., the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
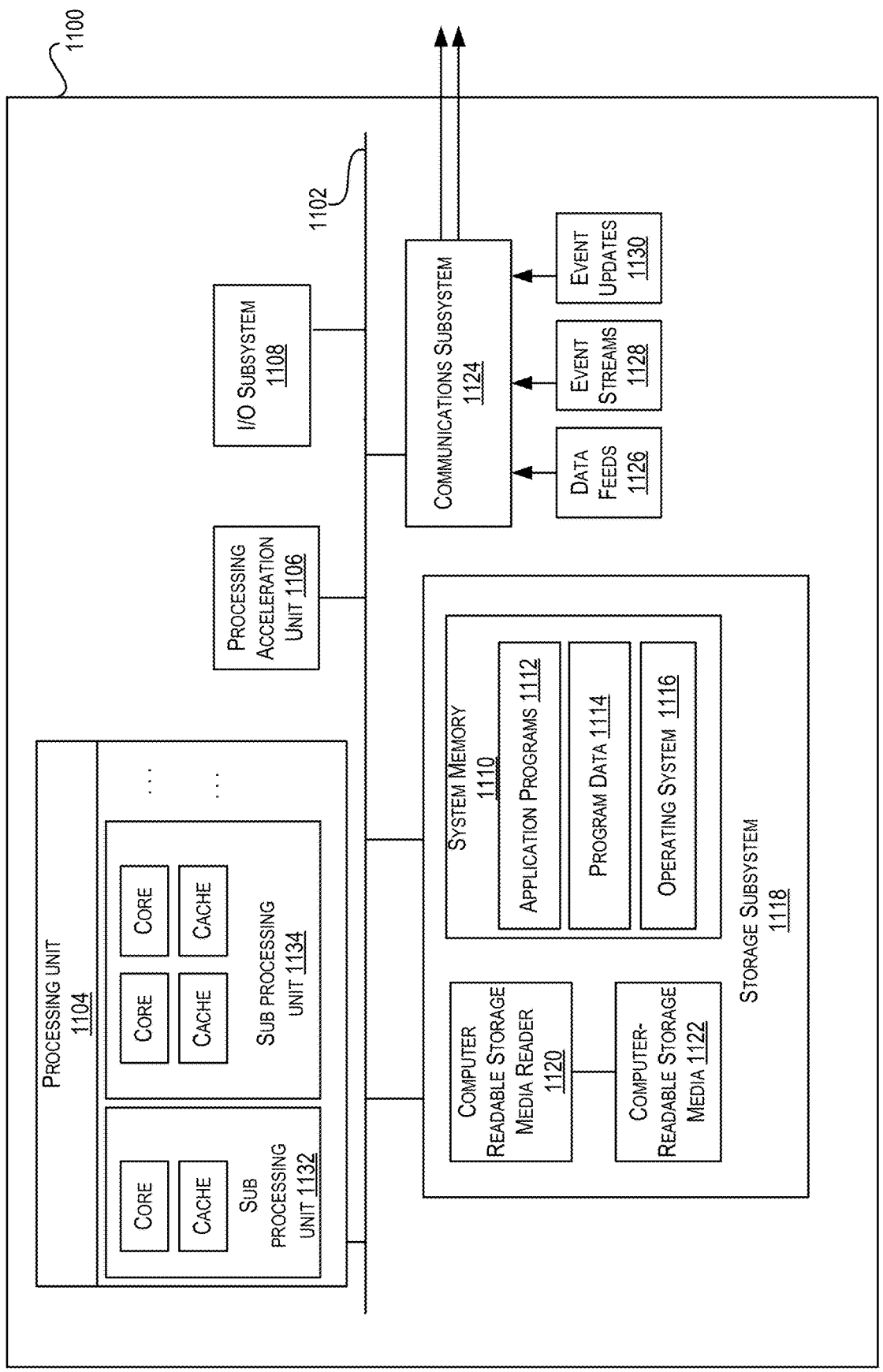
FIG. 11 is a block diagram illustrating an example computer system, according to at least one embodiment.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present disclosure.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer-readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem %524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 302.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, the method comprising:
monitoring, by a computing device, communication between a container executing on a host virtual machine and the host virtual machine, the host virtual machine comprising a first operating system, and the container comprising a first computer-executable instruction;
determining, by the computing device, that the first computer-executable instruction is configured to run on a second operating system based at least in part on monitoring the communication between the container executing on the host virtual machine and the host virtual machine;
determining, in response to determining the first computer-executable instruction is configured to run on the second operating system, a second computer-executable instruction configured to run on the first operating system, the second computer-executable instruction being accessible to the host virtual machine;
creating a memory-mapped file by mapping a logical address space to a physical address space of the host virtual machine;
storing the second computer-executable instruction in a memory-mapped file of the host virtual machine; and
attaching the memory-mapped file of the host virtual machine to a mounting point associated with an empty file of a virtual file system of the container.

2. The computer-implemented method of claim 1, wherein monitoring the communication between the container executing on the host virtual machine and host virtual machine comprises determining an error in response to executing the first computer-executable instruction.

3. The computer-implemented method of claim 1, wherein the second operating system is a base operating system of the container.

4. The computer-implemented method of claim 1, wherein the first computer-executable instruction is a first version of the first computer-executable instruction, and wherein the second computer-executable instruction is a second version of the first computer-executable instruction.

5. A cloud infrastructure node comprising:
a processor; and
a non-transitory computer-readable medium including instructions that, when executed by the processor, cause the processor to:
monitor communication between a container executing on a host virtual machine and the host virtual machine, the host virtual machine comprising a first operating system, and the container comprising a first computer-executable instruction;
determine that the first computer-executable instruction is configured to run on a second operating system based at least in part on monitoring the communication between the container executing on the host virtual machine and the host virtual machine;
determine, in response to detecting that the first computer-executable instruction is configured to run on the second operating system, a second computer-executable instruction configured to run on the first operating system, the second computer-executable instruction being accessible to the host virtual machine;
create a memory-mapped file by mapping a logical address space to a physical address space of the host virtual machine;
store the second computer-executable instruction in a memory-mapped file of the host virtual machine; and
attach the memory-mapped file of the host virtual machine to a mounting point associated with an empty file of a virtual file system of the container.

6. The cloud infrastructure node of claim 5, wherein monitoring the communication between the container executing on the host virtual machine and host virtual machine comprises determining an error in response to executing the first computer-executable instruction.

7. The cloud infrastructure node of claim 5, wherein the second operating system is a base operating system of the container.

8. The cloud infrastructure node of claim 5, wherein the first computer-executable instruction is a first version of the first computer-executable instruction, and wherein the second computer-executable instruction is a second version of the first computer-executable instruction.

9. A non-transitory computer-readable medium including stored thereon a sequence of instructions which, when executed by a processor, causes the processor to perform operations comprising:
monitoring communication between a container executing on a host virtual machine and the host virtual machine, the host virtual machine comprising a first operating system, and the container comprising a first computer-executable instruction;
determining that the first computer-executable instruction is configured to run on a second operating system based at least in part on monitoring the communication between the container executing on the host virtual machine and the host virtual machine;
determining, in response to detecting that the first computer-executable instruction is configured to run on the second operating system, a second computer-executable instruction configured to run on the first operating system, the second computer-executable instruction being accessible to the host virtual machine;
creating a memory-mapped file by mapping a logical address space to a physical address space of the host virtual machine;
storing the second computer-executable instruction in a memory-mapped file of the host virtual machine; and
attaching the memory-mapped file of the host virtual machine to a mounting point associated with an empty file of a virtual file system of the container.

10. The non-transitory computer-readable medium of claim 9, wherein monitoring the communication between the container executing on the host virtual machine and host virtual machine comprises determining an error in response to executing the first computer-executable instruction.

11. The non-transitory computer-readable medium of claim 9, wherein the second operating system is a base operating system of the container.

12. The non-transitory computer-readable medium of claim 9, wherein the first computer-executable instruction is a first version of the first computer-executable instruction, and wherein the second computer-executable instruction is a second version of the first computer-executable instruction.

* * * * *